(12) United States Patent
Settele

(10) Patent No.: US 6,543,344 B1
(45) Date of Patent: Apr. 8, 2003

(54) CULINARY PRESS

(75) Inventor: Ignaz Settele, Kaufbeuren (DE)

(73) Assignee: Maxpat Trading & Marketing (Far East) Limited, Kowloon (HK)

( * ) Notice: Subject to any disclaimer, the term of this patent is extended or adjusted under 35 U.S.C. 154(b) by 235 days.

(21) Appl. No.: 09/708,178

(22) Filed: Nov. 7, 2000

(30) Foreign Application Priority Data

Nov. 8, 1999 (GB) ................................ 9926444

(51) Int. Cl.⁷ .............................. A47J 19/06; B30B 9/02
(52) U.S. Cl. ...................... 100/243; 100/110; 100/116; 100/120; 100/125
(58) Field of Search .................. 100/110, 116, 100/120, 125, 243

(56) References Cited

U.S. PATENT DOCUMENTS

| | | | | |
|---|---|---|---|---|
| 879,870 A | * | 2/1908 | Hansen ...................... 100/228 |
| 1,026,696 A | * | 5/1912 | Nemes ...................... 100/228 |
| 1,542,322 A | * | 6/1925 | Rollman ..................... 100/135 |
| 1,557,547 A | * | 10/1925 | Anderson .................... 100/243 |
| 4,545,299 A | * | 10/1985 | Ahner ....................... 100/112 |
| 5,101,720 A | * | 4/1992 | Bianchi ..................... 100/112 |
| 5,463,941 A | | 11/1995 | Gibson |
| 5,513,562 A | * | 5/1996 | Moor ........................ 100/112 |
| 5,791,237 A | | 8/1998 | Gibson |
| 6,109,170 A | * | 8/2000 | Short et al. ................ 100/112 |

FOREIGN PATENT DOCUMENTS

| | | |
|---|---|---|
| GB | 2288114 | 10/1995 |
| TW | 105782 | 11/1988 |
| TW | 252331 | 7/1995 |

* cited by examiner

Primary Examiner—William Hong
(74) Attorney, Agent, or Firm—Smith-Hill and Bedell

(57) ABSTRACT

There is provided a culinary press 1 including first and second handle members 2, 4, between which is provided a food pressing lever 14 pivotably connected at one end to the second handle member 4, an actuator 16 connected to the first handle member 2 acting on the other end of the lever 14.

7 Claims, 5 Drawing Sheets

CULINARY PRESS

BACKGROUND OF THE INVENTION

This invention relates to a culinary press having particular but not exclusive applicability as a garlic press.

Culinary presses of the type used to crush garlic are well known. There are a variety of forms to suit different needs. A known form of garlic press consists of two pivotably connected handles, one of which is provided with a chamber into which food is to be placed having a perforated surface, and the other provided with a plunger which presses into the chamber when the handles are brought together thus crushing and forcing the clove through a perforated surface.

One problem with such a garlic press is that a significant force is required to bring the handles together. Operating such a conventional press may therefore be difficult for some individuals.

It is thus an object of the present invention to provide a culinary press in which the aforesaid shortcoming is mitigated, or at least to provide a useful alternative to the public.

SUMMARY OF THE INVENTION

According to the present invention there is provided a culinary press comprising first and second arms pivotably connected together, the second arm having a foodreceiving chamber thereon, and a food pressing lever arranged between the arms and pivotably connected at one end to the second arm, an actuator connected to the first arm acting on the other end of the lever. The use of the additional food pressing lever arranged between the arms allows a high crushing force to be exerted on the food.

The actuator of the press may comprise an actuator arm pivotably connected at one end to the first arm and at the other end to the lever. The lever may then be acted upon by the actuator arm as the handle members are brought together.

The chamber of the press may be defined between opposed side walls of the second arm and a perforated plate forming a bottom of the chamber. The chamber provides a space where the piece of food to be crushed is placed therein.

The perforated plate of the press may be a movable plate pivotably mounted on the second arm, which can be pivotably moved out of the chamber to provide easy access for cleaning. The perforated plate and lever of the press may be mounted on the second arm to pivot about axes which are coincident.

The actuator arm of the press may be of T-shaped form having a single main arm portion connected at one end to the first handle member and a cross-piece in the form of a pair of oppositely-extending pins which are received within bent over finger portions formed at the end of the food pressing lever opposite to the pivot with the second arm.

The first arm of the press is preferably of channel shaped section dimensioned to at least partly receive the second arm when the press is in a closed position. This allows the press to be more compact and easily stored when the arms are brought together.

An embodiment of the present invention will be described below by way of an example only, and with reference to the following drawings, in which:

DETAILED DESCRIPTION

Figure 1:
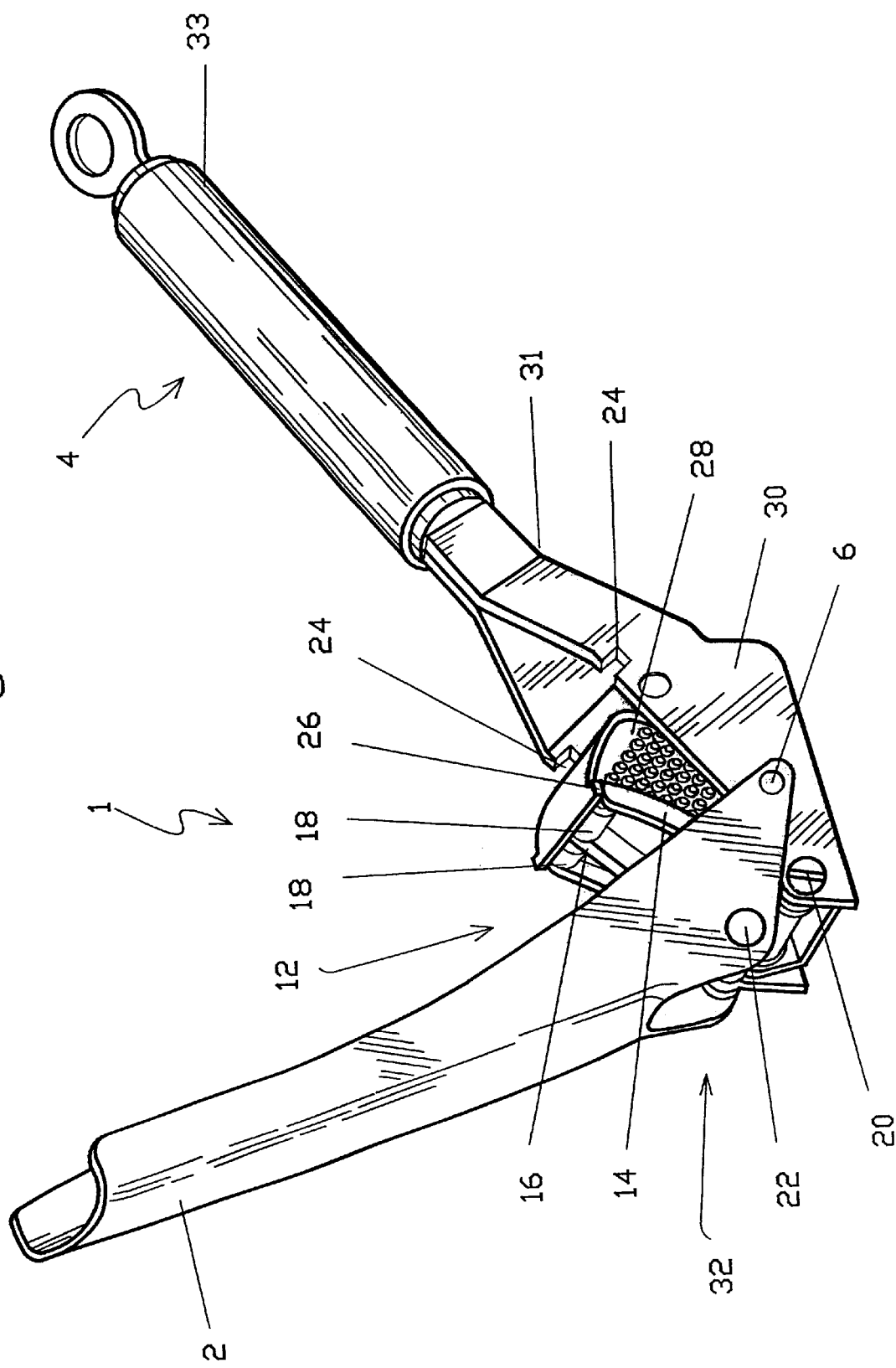
FIG. 1 is a perspective view of a culinary press according to an embodiment of the present invention in an "open" position.
Figure 2:
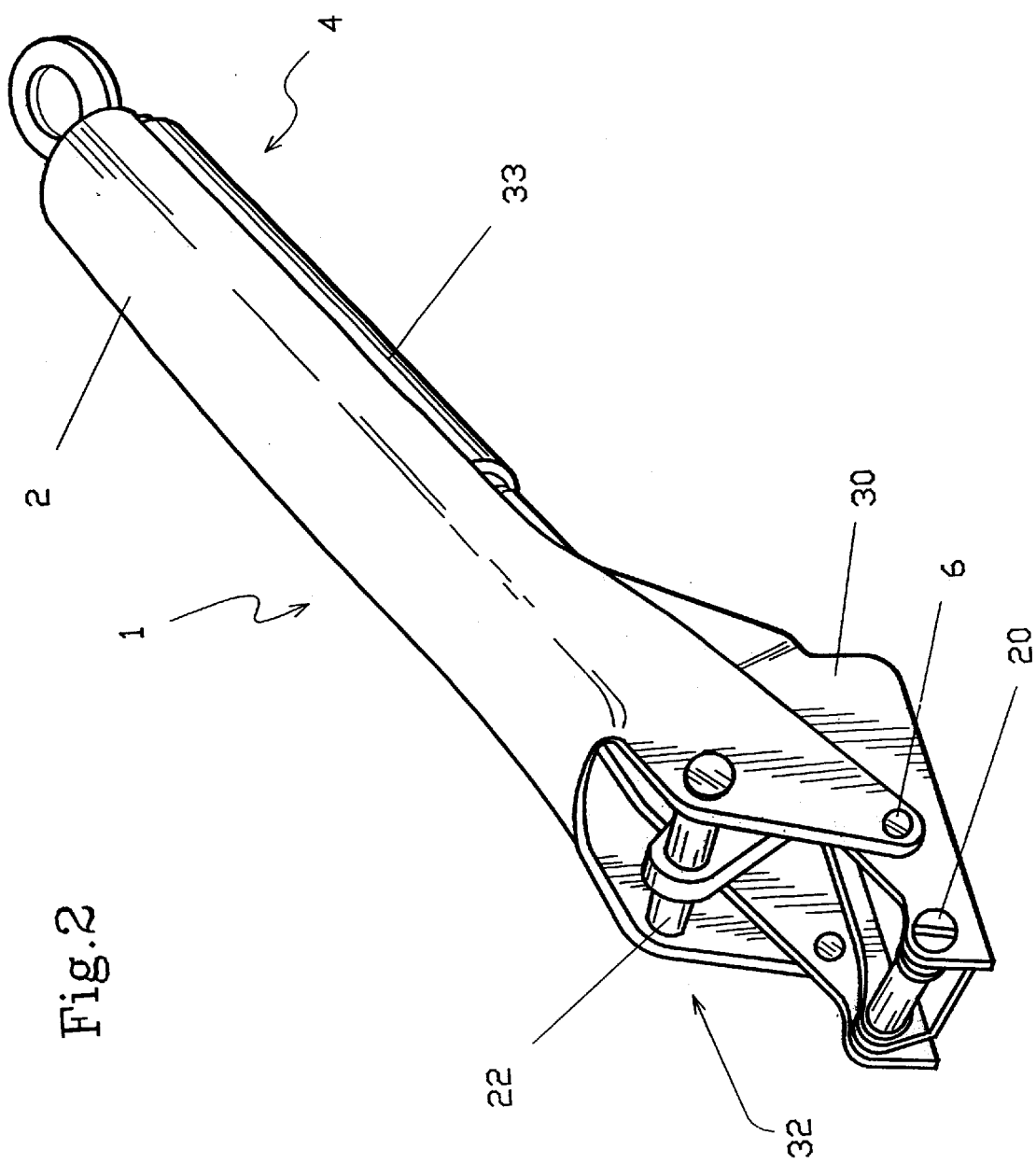
FIG. 2 is a perspective view of the culinary press in a "closed" position.
Figure 3:
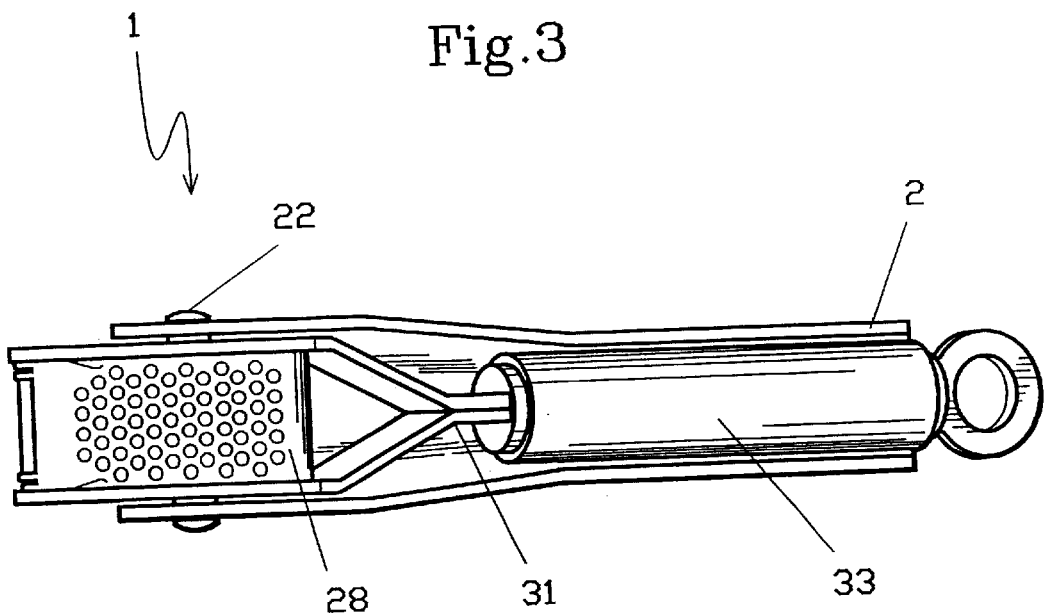
FIG. 3 is a bottom view of the culinary press showing a perforated surface.
Figure 4:
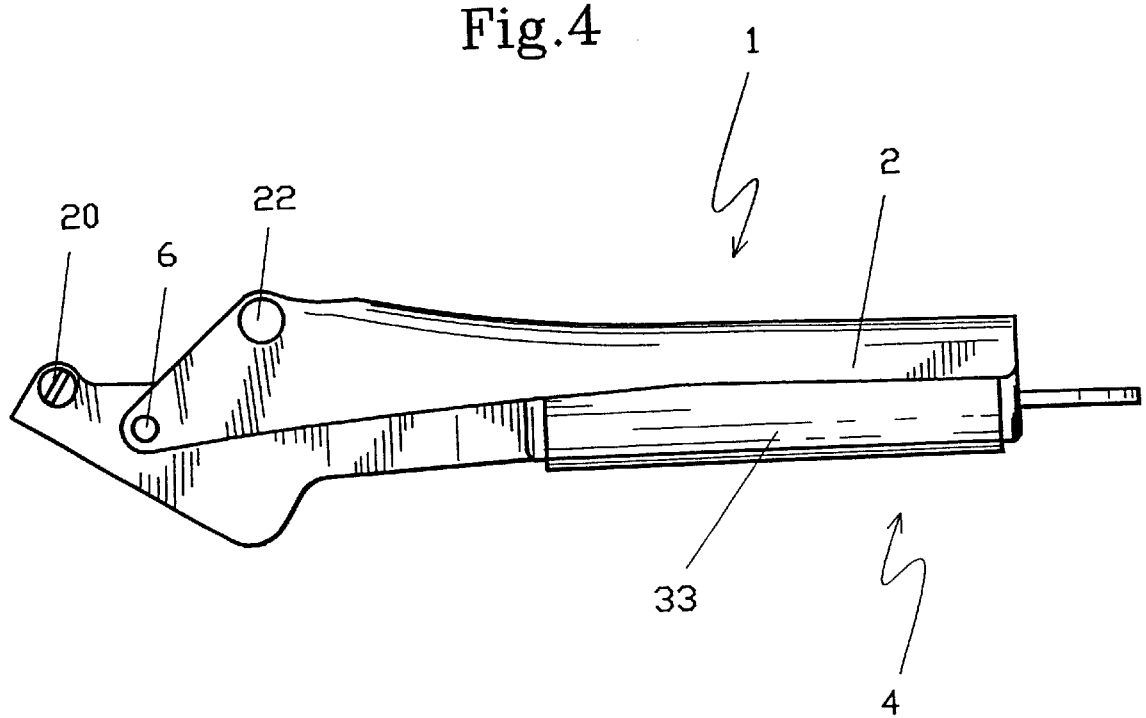
FIG. 4 is a side view of the culinary press.

An embodiment of a culinary press according to the present invention is shown in FIGS. 1 to 6 and is generally designated as 1. Referring to FIG. 1, the press 1 comprises first and second elongate arms which constitute at least at their free ends handle members 2, 4. The first and second handle members 2, 4 are pivotably connected by means of two shaft members 6. The first and second handle members 2, 4 are of complimentary shape, the first handle member 2 having a channel-shaped construction so that when the press is in a "closed" position, the second handle member 4 is partly received inside the first handle member 2, as shown in FIG. 9. This allows the press 1 to be particularly compact.

Figure 5:
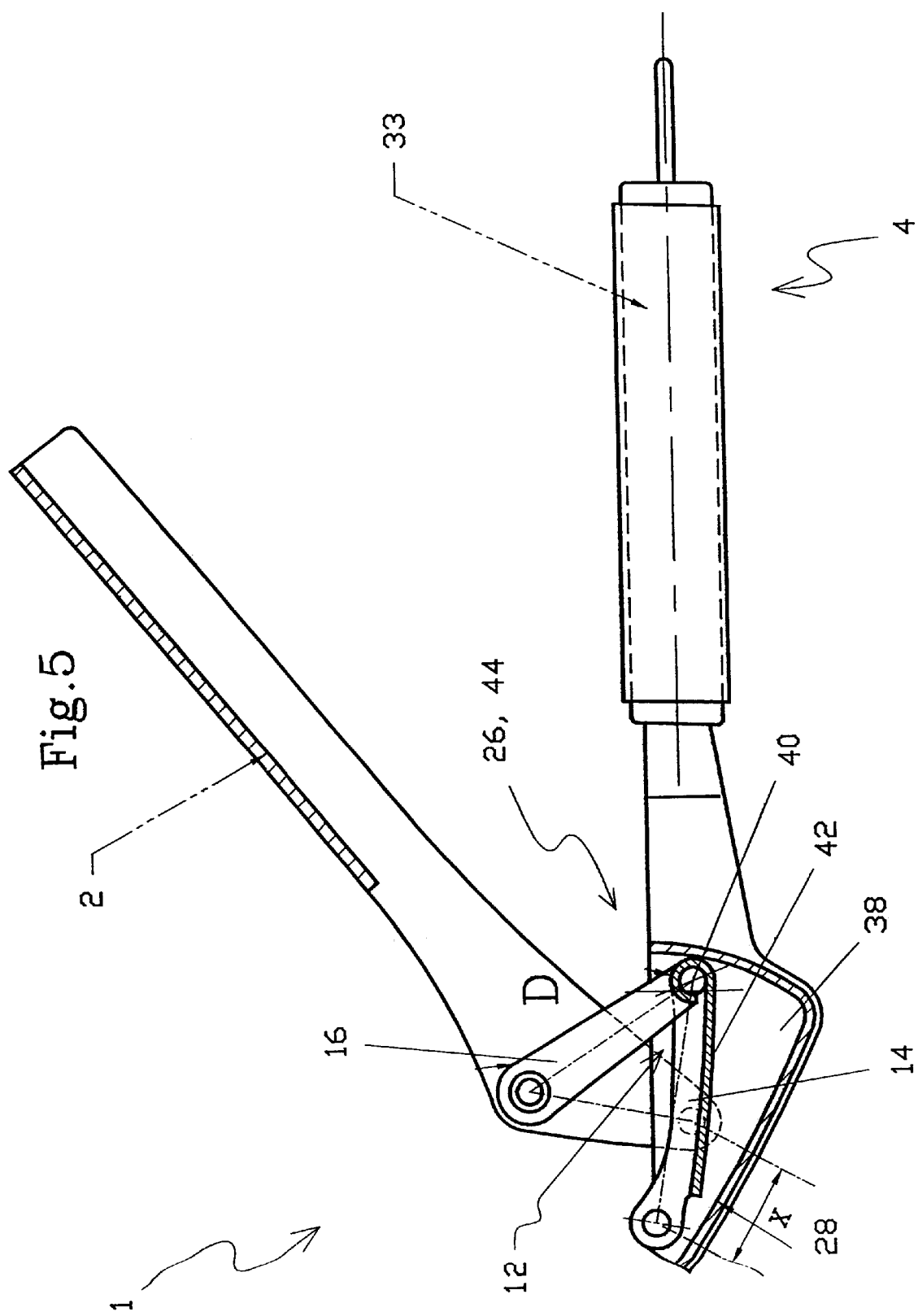
FIG. 5 is a cross sectional view of the culinary press in an "open" position.

The second handle member 4 comprises, at the end at which it is joined to the first handle member 2, a pair of parallel side walls 30 which bend inwardly to meet at 31 and a tubular section 33. Arranged between the side walls 30 is a perforated plate 28 pivotably connected by a shaft or bolt 20 extending between the side walls 30. The plate 28 has a substantially flat or slightly curved pressing surface, and a bent portion having at its upper end a pair of outwardly directed lugs 26. As shown in FIG. 5, a chamber 38 for receiving food to be crushed is defined by the plate 28 and two side walls 30.

Figure 6:
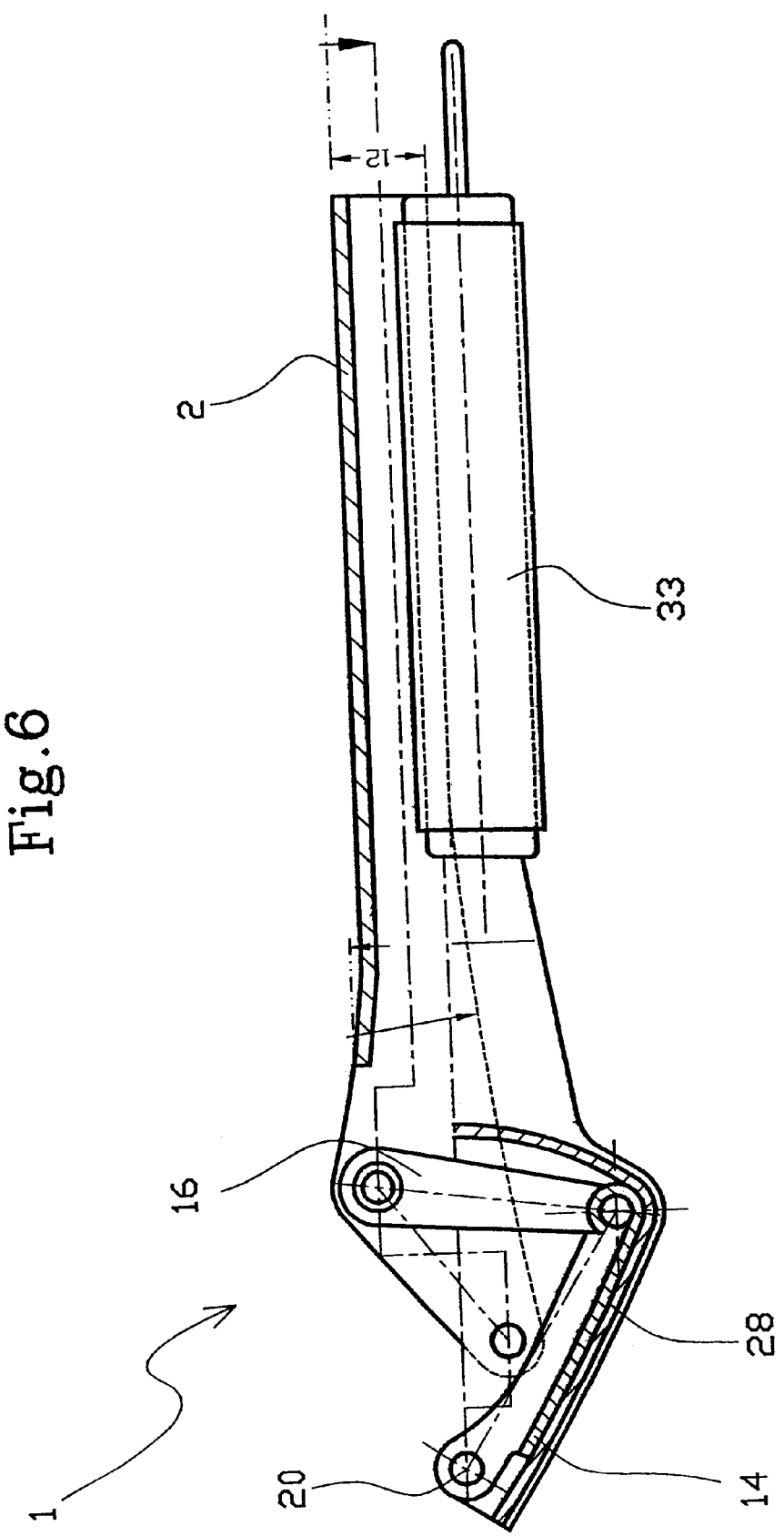
FIG. 6 is a cross sectional view of the culinary press in a "closed" position.

As best seen in FIGS. 5 and 6, between the handle members 2, 4 a food pressing means 12 is provided which comprises a first food pressing lever arm 14 and second actuating arm 16. The first food pressing lever arm 14 is pivotably connected at one end to the side walls 30 also by means of shaft 20, and pivotably connected to the second actuating arm 16 at 40. The first food pressing lever arm 14 has at its lower side a pressing surface 42. As indicated in FIG. 5, the pivotal connection of the handles 2, 4 is spaced from the pin point of the lever arm 14 by a distance x, which is nearly half the length of the chamber 38.

The second actuating arm 16 is of generally T-shaped construction (for example when viewed from above) having a single main body portion, pivotably connected to the first handle member 2 at position 32. A bore is provided on this end of the main body portion of the actuating arm 16. A pin 22 extends between opposed side walls of the first handle, passing through this bore. At the opposite end the actuating arm 16 has a crosspiece in the form of a pair of oppositely extending pins. The end of the first food pressing lever arm 14 away from the pivot has a pair of fingers 18 which curl around the pins of the T-shaped actuating arm 16 forming the pivotal connection therebetween.

In use, the first and second handle members 2, 4 of the press 1 are brought apart so that the press 1 is in an "open" position as shown in FIG. 1. The movable plate 28 is pushed downwards so that the lugs 26 sit in notches 24 in the side walls 30 as shown in FIGS. 1 and 5. The piece of food to be crushed is placed within the chamber 38 sitting on the perforated plate 28. As the first handle member 2 is brought towards the second handle member 4, the actuating arm 16 acts on the first food pressing lever arm 14 which moves towards the perforated plate 28 thereby crushing the food against the perforated plate 28.

The arrangement of the intermediate lever arm 14 allows a high force to be exerted on the food as compared to a conventional press.

Cleaning of the press can easily be achieved by moving the press into an "open" position and pivoting the perforated plate 28 out of the chamber 38 as shown in FIG. 1, whereat the perforated plate 28 can be readily accessed for removing food debris, or the crushed food, depending upon what food is being crushed. When the press is in a closed position, the pair of fingers 18 of the food pressing lever arm 14 are relatively tightly fitted against an inner surface of the perforated plate 28. As the arms 2, 4 of the press 1 are brought apart in an open position, the perforated plate 28 is carried up with lever arm 14 allowing it to be easily accessed by the user and allowing for easy removal of the crushed food. The slight springiness of the plate 28 allows it to also be readily detached from the lever arm 14.

The different parts of the press are preferably formed of stainless steel, although other suitable materials can be used to achieve similar results.

What is claimed is:

1. A culinary press comprising first and second arms pivotably connected together, the second arm having a food-receiving chamber thereon, and a food pressing lever arranged between the arms and pivotably connected at one end to the second arm, an actuator connected to the first arm acting on the other end of the lever.

2. A press as claimed in claim 1 wherein the actuator comprises an actuator arm pivotably connected at one end to the first arm and at the other end to the lever.

3. A press as claimed in claim 1 wherein the chamber is defined between opposed side walls of the second arm and a perforated plate forming a bottom of the chamber.

4. A press as claimed in claim 3 wherein the perforated plate is a movable plate pivotably mounted on the second arm.

5. A press as claimed in claim 4 wherein the perforated plate and the lever are mounted on the second handle member to pivot about axes which are coincident.

6. A press as claimed in claim 4 wherein the actuator arm is of T-shaped form having a single main arm portion connected at one end to the first handle member and a cross-piece in the form of a pair of oppositely-extending pins which are received within bent over finger portions formed at an edge of the perforated plate opposite to its pivot.

7. A press as claimed in claim 1 wherein the first arm is of channel shaped section dimensioned to at least partly receive the second arm when the press is in a closed position.

\* \* \* \* \*